Inventor
CHESTER W. NEWELL
By Harvey J. Lambert
Atty

Inventor
CHESTER W. NEWELL
By Harvey G. Lawshurst
Atty

United States Patent Office 3,141,926 Patented July 21, 1964

3,141,926

COLOR RECORDING COMPENSATION UTILIZING TRAVELING WAVE TUBE DELAY

Chester W. Newell, Sunnyvale, Calif., assignor to Ampex Corporation, Redwood City, Calif., a corporation of California Filed May 12, 1960, Ser. No. 28,699
2 Claims. (Cl. 178—5.4)

The present invention relates generally to a recording system and apparatus useful therewith and more particularly to a system for recording signal intelligence on a magnetic medium and to delay devices useful therewith.

In general, a magnetic recording system includes a magnetic medium such as a magnetic tape, and a transducing means, such as a recording head, movable relative to the magnetic medium. An electrical signal to be recorded is applied to the transducing means and is thereby transferred to the magnetic medium as a magnetic flux pattern.

When it is desired to reproduce the signal, the transducing means may be moved relative to the magnetic medium at the same speed as employed in recording the signal. The flux pattern in the magnetic medium produces a signal at the transducing means, which signal is proportional to the rate of change of flux passing the transducing means. The signal is then amplified and processed for transmission.

One well-known recording system employs a relatively wide magnetic tape together with a head assembly which rotates transversely of the tape. The head assembly includes four circumferentially spaced magnetic heads which sweep successively across the tape as it is drawn lengthwise of the head assembly. Such a recording system is used extensively for recording a signal containing a wide band of frequencies, such as a television signal.

The quality of the reproduced signal depends upon the uniformity of record-reproduce conditions. Any nonuniformity results in time base displacement, that is, the geometric displacement of portions of the waveform in the reproduced signal. Uniformity of record and reproduce conditions must be especially maintained when a television signal is being recorded and reproduced. The reason for this is that the eye is much more susceptible to distortion than the ear.

Possible sources of time base displacement in the record and reproduce modes in a rotating head drum recording system are: the instantaneous angular velocity of the head drum assembly relative to the tape may not be uniform; head misalignment; differential magnetic tape stretching; variation in bearing friction; tape guide misalignment; variation in tape pressure, etc.

Ordinarily, the rotational velocity of the tape relative to the head drum assembly are controlled by servo systems which maintain the time base displacement in the record and reproduce modes at a minimum. However, the remaining uncompensated time base displacement may be objectionable in certain signals, such as monochrome and color television signals, wherein a time base displacement may cause vertical discontinuities, skewing, etc. in the reproduced picture, which may result in hue shifts in color on a television receiver.

One of the causes of the uncompensated time base displacement is that with present day servo systems it is difficult to maintain the instantaneous speed of the tape and the head assembly within the error allowable in such signals. The servo systems maintain the average rotational velocity of the head drum assembly, but the instantaneous angular velocity varies over narrow limits because of changes in drag or forces acting upon the head drum assembly. Uneven stator windings in the driving motor, walking bearings, and changes in tape pressure contribute to this error.

The moment of inertia of the head assembly is too great to respond to small instantaneous amounts of increased or decreased drag, and therefore, the energy represented by small variations in drag is stored in the head assembly. This energy is dissipated in a sinusoidal hunt, whose rate is the resonant frequency of the rotating assembly. Hunting of the head assembly substantially adds to the time base displacement.

When recording a color video signal, a time base displacement besides causing the same distortions as occur in monochrome television, also may result in an unintelligible color reproduction. Hence, there are stringent requirements for the recording of a color television signal.

To illustrate, the color television system in general use in the United States employs a composite waveform obtained by multiplexing techniques. The color video signal may be considered as made up of four basic forms of information transmitted in proper sequence, namely: synchronization information to establish a raster for presenting the picture material in proper position in time and space; picture luminance information; picture chroma information on a subcarrier; and synchronization information for chroma picture material. The synchronization information and picture luminance information are used in both monochrome and color video transmission.

The composite color video signal contains, in addition to the luminance information and the synchronization information, two other components carrying the color information. These are the I and Q components which amplitude-modulate separate subcarrier waves having a frequency of approximately 3.58 mc. The phase difference between these two subcarriers is 90°. During transmission, the subcarrier wave signals are added to the luminance (Y) signal to provide the standard NTSC signal, which also includes the reference burst signal. The burst signal controls the phase of a synchronous oscillator to afford synchronous detection in the receiver. The output of the receiver's detector comprises the I and Q components or variations therefrom which are matrixed with the Y signal thereby providing the red, blue and green components for reproduction as a color picture.

The chroma-synchronization information is transmitted by a burst of subcarrier at the back-porch level immediately following each horizontal synchronizing pulse. Since this subcarrier burst determines the relative phase of the subcarrier oscillator in each video receiver with respect to the chroma material at picture level, it is imperative that this phase relation be closely maintained.

A departure of as little as 5 degrees from the fixed phase representing a color hue will visibly alter the hue or dominant wave length of the reproduced color. Transferred to a time axis, one cycle of a 3.58 megacycle signal equals 0.279 microsecond and five degrees of the 0.279 microsecond is 0.00387 microsecond. To account for this error in both the record and reproduce modes, only one-half of the 0.004 microsecond allowable time-base displacement may be permitted in each mode. Therefore, 0.002 microsecond becomes the stability requirement for direct color recording.

This figure is about two orders of magnitude better than the stability that can be maintained with present day servo systems. Consequently, for an acceptable reproduced color picture, it is especially desirable to employ a time base compensation to magnetically record and playback a color television signal to avoid complex decoding and recoding before transmission.

Ordinarily conventional delay devices provide a constant delay. Such devices may not be used for time base compensation because, in a magnetic recording system, the required time base compensation may vary because of variable drags on the head, etc. Therefore a delay device having a controllable delay is required to make the required time base compensation in the signal.

Previously available controllable delay devices have been, in general, limited in frequency response, and therefore have been limited to relatively narrow band width signals. Also, previously available controllable delay devices have been relatively slow in compensating for time base displacements in the signal.

An object of the present invention is the provision of an improved recording system.

Another object of the invention is the provision of a delay device for a recording system.

Still another object is the provision of a wide band controllable delay device.

A further object is the provision of a recording system which incorporates a delay device to compensate for time base displacement in the reproduced signal.

A further object is the provision of a broad band time delay device which may be instantaneously controlled to vary the delay afforded by the device.

Still a further object is the provision of a time delay device which is durable and inexpensive to manufacture.

Other objects and advantages of the present invention will become apparent by reference to the following description and accompanying drawings.

A recording system in accordance with the present invention is employed to record and reproduce a composite signal which includes a timing signal. The recording system includes a transducer and a recording medium in recording relationship with the transducer. The composite signal to be recorded is applied to the transducer which, in turn, records the composite signal on the recording medium. The recorded composite signal is reproduced from the recording medium by the transducer and is passed through a controllable delay means. Means are provided for deriving a control signal from the reproduced composite signal, which control signal is related to the difference in timing between the reproduced timing signal and a reference signal, which is related to the timing signal applied during recording. Means are provided for applying the control signal to a control means which controls the delay afforded by the time delay means in such a way as to compensate for time base displacement in the reproduced composite signal.

Figure 1:
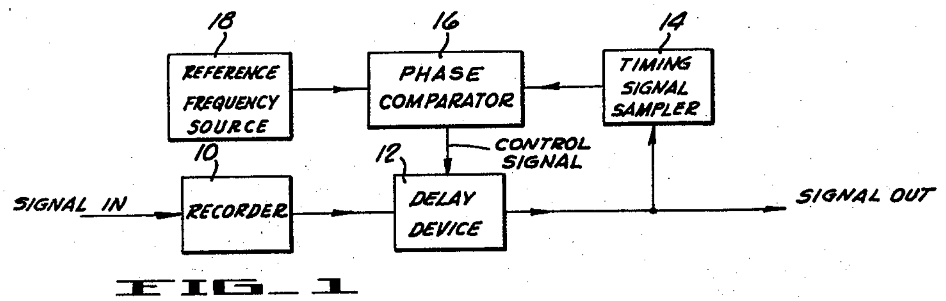
FIGURE 1 is a block diagram showing a recording system in accordance with the present invention.

More specifically, as illustrated in FIGURE 1, a composite signal which includes a timing signal is provided by a suitable source (not shown), such as a television camera. The composite signal is fed to a recorder 10 which, for example, may be a conventional broad band magnetic tape recorder. One such recorder is fully described in Patent No. 2,866,012, issued December 23, 1958.

Generally, in a magnetic recorder, a signal is amplified and applied to a transducer. The transducer, in turn, records the signal as a flux change on a magnetic medium which is moved relative to the transducer. When reproducing the recorded signal, the magnetic medium is moved relative to the transducer and the signal is sensed by the transducer. The signal is then amplified and processed for transmission.

As previously indicated, during recording and reproducing there may be a time base displacement in the reproduced signal because of, for example, fluctuations in the relative speed between the magnetic medium and the transducer. In other words, a signal which arrives at the transducer with a certain time relationship between portions of its waveform, may be reproduced with a different time relationship.

Time base displacement, while not being of vital importance in sound reproduction, is very disturbing in video signal reproduction since the eye is more susceptible to time base displacement than the ear. As previously indicated, it is especially important to compensate for time base displacement when recording and reproducing a color video signal because, for example, a change in phase between the chrominance information and the color burst will cause a distracting change in hue in the reproduced picture at the receiver.

In view of the importance of time base compensation in the recording and reproducing of color video signals, the recording system will hereinafter be described in connection with the recording and reproducing of a color video signal. However, it should be understood that the hereinafter described system and apparatus may be employed to compensate for time base displacement in other signals than a color video signal.

As previously indicated in a color video signal, a color burst occurs at the back portion of each horizontal synchronizing pulse. The color bursts are ordinarily generated by a constant frequency oscillator. Therefore, when the color video signal is recorded, the amount of time base displacement of the recorded color video signal may be determined by comparing the reproduced color burst signal with a reference signal having a frequency equal to the color burst signals. Thus, the color burst signal serves as a timing signal.

In the embodiment illustrated in FIGURE 1, the recorded color video signal is reproduced by the recorder 10 and is fed through a controllable time delay device 12, which is fully described hereinafter. The time delay afforded by the delay device 12 is controllable to instantaneously and continuously compensate for time base displacement in the color video signal. The color burst in the reproduced video signal at the output of the delay device 12 is sampled by a suitable means 14, such as a gating circuit. The color burst is applied to phase comparator 16 wherein the color burst is compared with a reference frequency provided by a suitable source 18 to provide a control signal proportional to the difference in phase between the signals. The control signal is applied to the delay device 12 in such a manner as to reduce the phase difference between the color burst and the reference signal thereby compensating for time base displacement in the video signal.

For comparison purposes, it is desirable to have a timing signal which is continuous. Since the color burst only occurs at the beginning of each television line, means is provided in the phase comparator 16 for providing the control signal between color bursts. An error memory device, such as a reset integrator may be used.

Employing a color burst to trigger an oscillator produces subjectively good time base compensation since the time base displacement in the scanning of one line is relatively minor. However, in certain applications, either it may be desirable to overcome this small discrepancy, or the required time base compensation may exceed the color burst signal by 180 degrees, in which case, an ambiguity would result. Also, in other applications, a signal may be recorded and reproduced which does not include a periodic timing signal. In such applications, the embodiment shown in FIGURE 2 may be used. In this embodiment a pilot or timing signal is simultaneously recorded with the signal.

The color video signal to be recorded is applied to a modulating means 20. Because of the inherent difficulties in amplitude modulation, frequency modulation is used. A frequency modulation system which may be used is more completely described in a pending application, Serial No. 524,004, filed July 25, 1955, now Patent No. 2,956,114.

A timing or pilot signal provided by a suitable frequency source 22, such as an oscillator, is combined with the frequency modulated signal to act as a timing signal during the recording and reproducing. Preferably, to prevent distortion in the color video signal and for ease of separation of the timing signal from the video signal, the timing signal has a frequency which is less than the lower side band limit of the frequency modulated signal but greater than the lower cut off of a recorder 24 employed in the system. A convenient signal which may be utilized when recording color video signal is the color burst frequency divided by 4 or approximately 0.9 megacycle.

Such a timing signal may be provided by a color burst oscillator which is generally included in a color video recorder. The oscillator frequency is passed through a frequency divider before being recorded with the frequency modulated signal.

The frequency modulated signal and the pilot signal are applied to the recorder 24 wherein the frequency modulated signal and the timing signal (the composite signal) are simultaneously recorded on the magnetic medium. The recorder 24 may be similar to the one previously described in connection with FIGURE 1.

The recorded composite signal is reproduced by the recorder 24 and applied to a controllable delay device 26 which is hereinafter described. The delay afforded by the delay device 26 is controlled to compensate for the time base displacement in the composite signal passing therethrough.

After the reproduced composite signal passes through the time delay device 26, the reproduced timing signal is separated from the reproduced frequency modulated color video signal by a suitable separator means 28, such as a low pass filter. The separated timing signal is then delivered to a phase comparator 30. The timing signal provided by the timing generator 22 is also applied to the phase comparator 30.

The phase comparator 30 provides a control signal which is proportional to the phase difference between the timing signal and the separated timing signal. The control signal is applied to the controllable delay device 26 to control the delay afforded by the delay device 26 to the signal. The delay is increased or decreased to compensate for any phase difference between the timing signal and the separated timing signal and thereby compensates for time base displacement in the color video signal.

After the reproduced timing signal is separated from the reproduced frequency modulated color video signal, the frequency modulated signal is delivered to a frequency demodulator 32 which converts the frequency modulated signal to its original form for subsequent transmission.

Another way in which the timing signal may be recorded with the video signal is by amplitude modulating the frequency modulated video signal with the timing signal and then recording the resultant signal. In this system, the timing signal may be separated from the reproduced video signal by a suitable detector circuit.

It should be understood that while in the illustrated embodiments the reproduced timing signal is separated or sampled after the delay device, the reproduced timing signal may be separated or sampled before the delay device in which case the error signal derived would require the delay line to "track" the time-base error.

Figure 2:
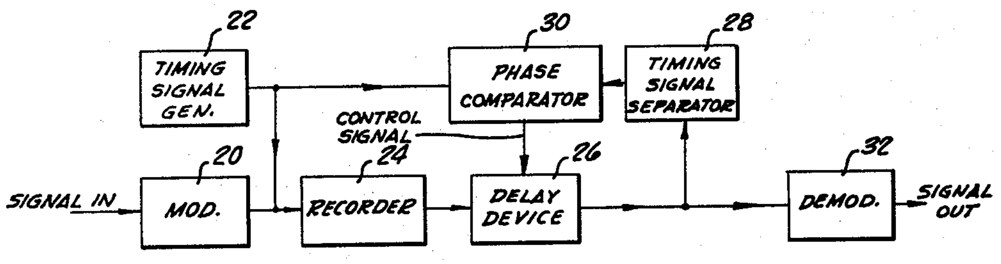
FIGURE 2 is a block diagram of another embodiment of a recording system in accordance with the present invention.
Figure 3:
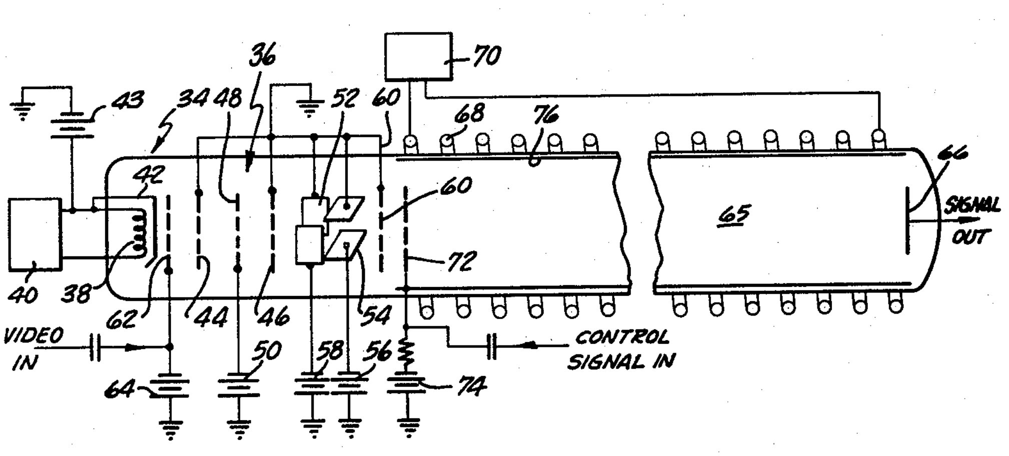
FIGURE 3 is a schematic diagram of a delay device in accordance with the present invention.

A delay device which may be utilized with the recording system shown in FIGURES 1 and 2 is shown in FIGURE 3. In this delay device the transit time of a beam of electrons, which has been intensity modulated by the reproduced signal, is controlled to vary the delay afforded the reproduced signal by the delay device.

In any electronic device incorporating the motion of electrons between a cathode and an anode, there is an inherent delay between the time that the electrons leave the cathode and the time when the electrons reach the anode. This delay is referred to as the transit time of the electrons and is inversely proportional to the velocity of the electrons. The velocity of the electrons in the electronic device, in turn, is proportional to the square root of the potential to which the electrons are subjected. Hence, by modulating the potential difference through which the electrons pass it is possible to control the transit time of the electrons and, therefore, the delay afforded by the electronic device.

More particularly, as shown in FIGURE 3, the delay device includes an evacuated tube or enclosure 34 of a suitable material, such as glass, metal, etc. A conventional electron gun 36 is provided in one end of the tube 34. The electron gun 36 includes a filament 38 heated by a source of power 40. A cathode 42 is connected to one side of the power source 40 and is maintained at a high negative voltage by a power source 43. The electrons provided by the cathode 42 are accelerated by a pair of accelerating members 44 and 46 disposed sequentially along the tube 34, which members are connected to ground. The beam of electrons is focused by a focusing member 48 disposed between the accelerating members 44 and 46. The focusing member 48 is connected to source 50 of negative voltage. Horizontal and vertical deflection plates 52 and 54, respectively, are provided in the tube 34 after the second accelerator 46. The plates 52 and 54 are respectively connected to negative voltage sources 56 and 58.

The beam of electrons passes through an anode 60 constructed of a wire grid which is disposed in the path of the beam beyond the deflection plates 52 and 54. The anode 60 is connected to ground and, hence since the cathode is at a negative voltage, the voltage of the anode 60 with respect to the cathode 42 is positive. Therefore, the electrons passing the anode 60 have a velocity proportional to the square root of the potential of the cathode 42. For example, if the cathode is at a negative 1,000 volts the electrons are at a velocity proportional to the square root of 1,000 volts.

The beam of electrons is intensity modulated by a control grid 62 disposed in the path of the beam between the cathode 42 and the first accelerating member 44. The control grid 62 is negatively biased by a D.-C. power source 64, and the signal to be delayed is applied thereto. Consequently, the variations in the intensity of the beam of electrons are a representation of the signal.

After passing through the anode 60, the intensity modulated beam of electrons is passed through an elongated drift path or delay section 65 of the tube 34. The beam of electrons is collected by a collector 66 of a suitable material, such as copper, disposed at the far end of the tube 34.

In order to constrain the electrons to move along the delay section 65 without dispersing because of mutual repulsion or poor focusing, a magnetic field, which extends axially along the tube 34, is utilized to focus the beam. The field is made strong enough so that the electrons do not strike the walls of the tube 34. In the illustrated embodiment the magnetic field is provided by a long air core solenoid 68 disposed about the delay section 65. The solenoid 68 is coupled to a source 70 of D.-C. voltage. It should be understood that periodic electrostatic focusing may also be used.

In one embodiment of the delay device, the electrons are constrained by a magnetic field having a magnitude approximately equal to 30 oersteds. The field is provided by passing a current of approximately 0.6 amp. through a solenoid having 40 turns/cm.

The maximum delay afforded by the delay device illustrated in FIGURE 3, may be increased by employing a longer delay section 65. The delay may be increased by reducing the velocity of the electrons entering the delay section 65.

In the illustrated embodiment, the velocity of the electrons and hence the delay afforded by the delay device is controlled by a grid 72 disposed at the beginning of the delay section 65. The grid 72 is negatively biased by a D.-C. voltage source 74. Hence, the velocity of the electrons passing through the grid 72 is reduced. To provide a relatively large delay, the grid 72 is biased to a potentional approximately equal to the voltage of the anode 60. For example, using ground as a reference if the anode is at ground potential (i.e., plus 1,000 volts with respect to the cathode) and the velocity modulating grid is at a negative D.-C. voltage of 920 volts, the velocity of the electrons entering the delay section 65 is proportional to the square root of 80 volts. This results in a transit time of approximately 0.17 microsecond for a 100 centimeters delay section 65.

In the illustrated embodiment, an equipotential field is maintained along the delay section 65 by lining the delay section 65 with a conductive material 76, which is connected to the grid 72. The lining 76 may be formed of a graphite dispersion or a tube of conductive material.

A control signal, which may be provided by the phase comparator 16, is coupled to the grid 72 to control the delay afforded by the delay device 65. A positive control signal decreases the delay and a negative signal increases the delay. For example, for a 100 centimeter delay section and a potential difference between the anode and grid of 80 volts, the transit time is varied between 0.10 and 0.34 microsecond by varying the voltage on the grid 72 between 130 volts and 30 volts. Hence, a variation in transit time of 0.24 microsecond is obtained. Consequently, a change in delay of approximately 0.25 microsecond for 100 centimeters of delay section length may be obtained with the described delay device. Preferably, the delay tube device is provided with at least a delay change of 0.25 microsecond in order to provide sufficient time base compensation. It has been found that the output signal decreases rapidly when the potential difference is reduced below 100 volts and becomes unmeasurable below 25 volts. Hence, it is difficult to increase the delay by reducing the potential difference beyond certain limits.

When the delay beam tube is employed as the delay device 12 in the embodiment shown in FIGURE 1, the reproduced signal is coupled to the control grid 52 and the control signal from the phase comparator 16 is coupled to the velocity modulating grid. Thus, the control signal serves to control the delay afforded by the delay beam tube to the reproduced signal to thereby compensate for time base displacement. The delay beam tube may likewise be employed as the delay device 26 in the embodiment illustrated in FIGURE 2.

It should be understood that an elongated drift path for a beam of carriers may be provided by other means than by passing the beam down a linear tube section. For example, an elongated drift path may be provided by employing a spiral beam of carriers. The beam of carriers may also be passed through a medium other than vacuum, as for example, a semiconductor material. Moreover, while the delay device illustrated in FIGURE 3 is described in connection with a reproducing system, the delay device may be utilized in other applications where, for example, instantaneous and continuous control of a broad band signal is desired.

Figure 4:
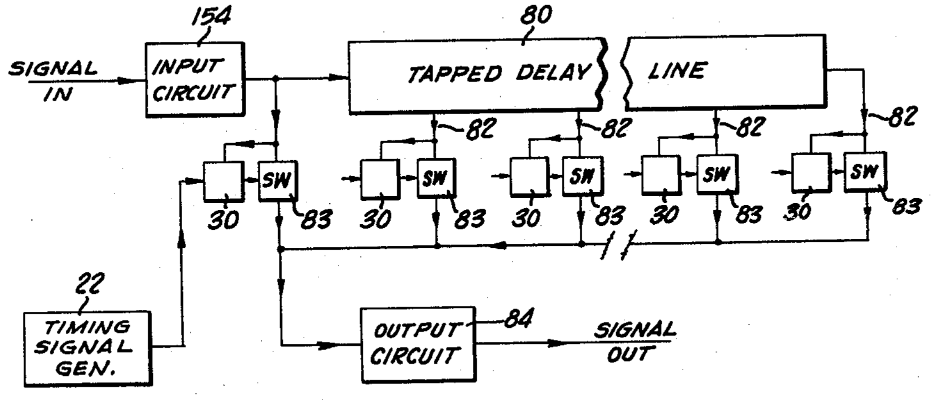
FIGURE 4 is a block diagram of another embodiment of a delay device in accordance with the present invention.

A time delay device which employs a delay line as a delay element is shown in block form in FIGURE 4. The illustrated time delay device is adapted to be utilized with the recording system shown in FIGURE 2. As previously indicated, in this recording system a timing signal is recorded with the video signal.

In the illustrated time delay device, a conventional lumped constant delay line 80 is utilized to delay the reproduced signal. To vary the amount of delay afforded the reproduced signal, a plurality of taps 82 are sequentially coupled to the delay line 80. Each of the taps 82 is connected to an output circuit 84 by an electronic switch 83. By connecting various of the taps 82 to the output circuit 84, the amount of delay afforded the reproduced signal is varied depending upon the length of the delay line 80 through which the reproduced signal passes before it is coupled to the output circuit 84.

For example, if a 1 microsecond delay line is employed and 20 equally spaced taps are coupled to the delay line 80, each tap represents a delay increment of approximately .05 microsecond. The first tap 82 is connected to the input of the delay line 80 and the 20th tap 82 is connected to the far end of the delay line 80. By closing the third switch 83 a delay of 0.1 microsecond is imposed on the reproduced signal.

When compensating for time base displacement in a reproduced color video signal, it is necessary, as previously indicated, to correct the displacement to within .004 microsecond to provide a suitable reproduced color picture. Hence, the increment between taps 82 on the delay line 80 may not be greater than .004 microsecond. This would lead to an impractical number of taps 82 to provide an acceptable maximum delay.

In the illustrated embodiment, this difficulty is overcome by mixing the output of two adjacent taps 82. Accordingly, the resultant signal has an amplitude and phase angle which are the vectorial sum of the two outputs. Thus by varying the ratio of output signals from the taps, a signal with a continuously variable phase is obtained. As will be hereinafter described, the mixing of the signals from the adjacent taps 82 is accomplished by the switches 83.

In order to determine which delay line taps 82 are to be connected to the output circuit 84, the reproduced timing signal, which was simultaneously recorded with the video signal and has the same time base displacement, is applied together with the reproduced video signal to the input of the delay line 80. Hence, the delay imposed on the reproduced timing signal by the delay line 80 is substantially the same as the delay imposed on the reproduced video signal. Therefore, the phase of the timing signal at each tap 82 indicates the amount of delay that has been imposed on the reproduced video signal by the delay line 80.

The timing signal at each tap 82 is applied to a phase comparator 30 associated with each switch 83. A reference or clock signal, which has the same frequency as the timing signal and which is provided by the signal generator 22, is also applied to each phase comparator 30. The clock signal that is compared in the phase comparator 30 is preferably adjusted to be in quadrature with a reproduced timing signal, which has no time base displacement and which is delayed by approximately one-half of the delay line 80.

The timing frequency is selected so that the time for one cycle of the timing signal is greater than the maximum delay provided by the delay line 80. Hence, during any given cycle of the timing signal, there will be only one position along the delay line 80 where the reproduced timing signal is delayed sufficiently to be in exact quadrature with the reference signal. As will be hereinafter explained, the phase comparator 30 provides a signal which is dependent upon the phase difference between the phase of the reproduced timing signal at the tap in question and the quadrature phase of the clock signal. The phase comparators 30 are coupled to the associated switches 83 where the output signals from the phase comparators 30 serve to control the switches 83 and thereby connect the proper delay line taps to the output circuit 84.

In the illustrated embodiment, each switch 83 comprises a gated screen pentode circuit which is connected in series with the associated tap 82 and acts as a variable gain device in the tap 82. When the clock signal and the reproduced timing signal at a particular tap 82 are not exactly in quadrature the control signal from the associated phase comparator 30 decreases the transconductance of the pentode toward a minimum ultimately arriving at zero. When the clock signal and the reproduced timing signal are exactly in quadrature at a particular tap, the control signal from the associated phase comparator 30 increases the transconductance of the associated pentode to a maximum and the RF signal carrying the color video signal at the tap 82 is thereby amplified. When the clock signal and the reproduced timing signal are in quadrature between two taps, the phase comparators 30 associated with the two taps 82 vary the transconductance of the associated pentodes in the proper proportions.

Figure 5:
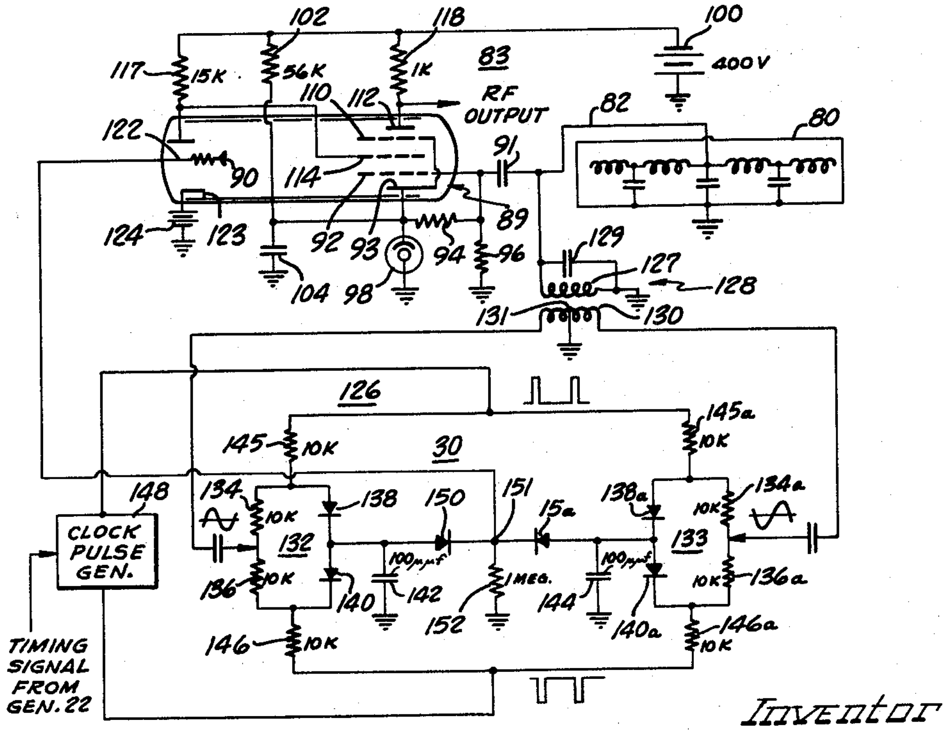
FIGURE 5 is a circuit diagram of the switch circuit and a phase comparator circuit of the delay device shown in FIGURE 4.

A gated screen pentode circuit which may be used is shown in FIGURE 5. In general, the circuit comprises a pentode tube 89, the transconductance of which is varied by varying the pentode's screen voltage. A triode tube 90 is employed to vary the screen voltage. The color video carrier signal from the associated tap 82 on the delay line 80 is connected through a coupling capacitor 91 to the control grid 92 of the pentode 89. Bias voltage with respect to the cathode 93 is provided for the control grid 92 by a voltage divider network which includes resistors 94 and 96.

The cathode 93 of the pentode 89 is biased more positive than the grid 92 by connecting the cathode 93 to ground through a voltage regulator (VR) tube 98, common to all switching tubes 89. The VR tube 98 is bled to the plus side of a D.-C. voltage supply 100 by a resistor 102 in order to maintain the VR tube 98 at firing voltage even when the pentode 89 is cut off. A high frequency by pass capacitor 104 is connected across the VR tube 98. The cathode 93 is connected internally to the suppressor grid 110 of the pentode 89. D.-C. voltage for the plate 112 of the pentode 89 is provided by coupling the power supply 100 through a load resistor 118 to the plate 112. The output circuit 84 is suitably coupled to the plate 112.

As previously indicated the transconductance of the pentode 89 is controlled by varying the D.-C. voltage of the screen grid 114 of the pentode 89. As shown in FIGURE 5, the screen voltage is controlled by a voltage divider network connected across the power supply 100. The voltage divider network includes a resistor 118 in series with the plate resistance 117 of the triode 90, the screen grid 114 being coupled between the triode 90 and the resistor 118. Consequently, as the plate resistance of the triode 90 is reduced, the screen voltage becomes less positive and the transconductance of the pentode 94 is decreased.

The plate resistance of the triode 90 is varied by the control voltage from the phase comparator 30 which voltage is applied to the grid 122 of the triode 90. In the illustrated embodiment, the grid 122 is biased negatively with respect to the cathode 123 of the triode 90 by a D.-C. voltage source 124 connected between the cathode 123 and ground. Hence, the transconductance of pentode 89 is at a maximum for a zero or "in quadrature" control voltage.

As shown in FIGURE 5, the sampling bridge gate circuit 126 is a combination double bridge phase comparator operating in principle like the four diode gate described in "Pulse and Digital Circuits," by Millman and Taub, pages 443–445, published in 1956. The reproduced timing signal at the associated tap is coupled to the primary 127 of a transformer 128, which primary 127 is tuned by capacitor 129 to the timing signal frequency. The secondary 130 of the transformer 128 is provided with a grounded center tap 131. One side of the secondary 130 (in phase signal) is coupled to one of the bridge gates 132 and the other side of the secondary 130 (180 degrees out of phase signal) is coupled to the other bridge gate 133.

Each of the bridge gates 132 and 133 includes a pair of series connected resistors 134, 134*a* and 136, 136*a* connected in parallel with a pair of series connected diodes 138, 138*a* and 140, 140*a*. The reproduced timing signal is coupled to each of the bridge gates 132 and 133 at a point between the series resistors 134 and 136, and 134*a* and 136*a*. The interconnections between diodes 138 and 140, and 138*a* and 140*a* of the gates 132 and 133 are respectively connected through capacitors 142 and 144 at a junction 151 which is tied to ground.

The clock signal is applied to the sampling circuit 126 in the form of a train of pulses, the pulse repetition rate of which is exactly equal to the frequency of the timing signal. As previously indicated, the clock signal is in quadrature with the reproduced signal which has no time base displacement and is delayed by one half of the delay line 80. The clock signal is provided by a time pulse generator 148 which may include a free running multivibrator. The multivibrator is synchronized by the timing signal from the timing signal generator 22, which timing signal is delayed for the preselected time interval by a delay circuit in the timing pulse generator 148. The output of the multivibrator is coupled to a phase splitter which provides two clock pulse signals, which are in antiphase with each other.

The positive clock pulses are supplied through dropping resistors 145, 145*a* to the upper sides of the bridge gates 132 and 133 as shown in FIGURE 5, and the negative clock pulses are supplied through dropping resistors 146, 146*a* to the lower sides of the bridge gates 132 and 133.

The clock pulses occur simultaneously at an average frequency substantially the same as that of the reproduced timing signal, and are phased to occur at the zero crossover of the sinusoidal timing signal. The D.-C. bias level for the positive and negative clock pulses, which are of the same amplitude and opposite polarity, is sufficient to maintain the diodes 138, 138*a* and 140, 140*a* in a reverse biased condition during all signal excursions of the timing signal. The amplitudes of the clock pulses are adequate to overcome such reverse bias to provide forward conduction of the diodes. Thus, when there is no time base errors, the output of the sampling bridge gate circuit 126 is zero thereby causing the signal switch at the center tap of the delay line 80 to go into a completely "on" condition.

However, if there is a time base error in the reproduced timing signal, which means that the phase of the timing signal differs from the phase of the sampling clock pulses, a positive voltage is developed at the junction 151 between the diode bridge gates 132 and 133. The positive voltage is developed when the diode switch 132 provides a positive output from the compared timing signal and clock pulses and causes the diode 150 to become forward conducting. At the same time, the diode 150*a* receives a negative output from the diode switch 133 and becomes reverse biased. Conversely, when the phase error is such that the output from the diode switch 132 is negative, the diode 150 is reverse biased while the diode 150*a* becomes forward conducting as a result of the positive voltage supplied from the diode switch 133.

The positive voltage developed at the junction 151 is then directed to the grid 122 of triode 90; the triode increases conduction thereby decreasing the anode voltage of triode 90. The reduced anode voltage, in turn, decreases the potential at the screen 114 of pentode 89 and accordingly reduces the transconductance of such pentode. When the plate voltage of triode 90 reaches the voltage of the pentode cathode 93 the transconductance of the pentode 89 becomes zero, cutting off the signal from that delay line tap completely. Therefore, whenever a positive voltage is developed by a bridge gate circuit 126, the switch 83 associated with its respective tap 82 begins to inactivate the tap in proportion to the output voltage.

The time base error may be of such value that adjacent taps coact in a complementary fashion to provide a proper mixing ratio thereby delaying the reproduced timing signal by an amount which is a function of the mixing ratio of the coacting taps; i.e. vectorial mixing is accomplished giving an effective continuous time-base correction.

For a higher switching voltage, the reproduced timing signal, before it is applied to the delay line 80, may be separated from the frequency modulated color video signal in an input circuit 154, suitably amplified, and then recombined with the carrier. Also, to facilitate removal of the reproduced timing signal at the output circuit 84 and to reduce timing signal interference, the timing signal's frequency may be reduced when it is separated from the color video signal, thereby substantially increasing the range capability without ambiguity.

It should be understood that the tapped delay line device described above may also be employed with the recording system shown in FIGURE 1. In addition, while the tapped delay line device is described in connection with a reproducing system, it may also be utilized in other applications where, for example, instantaneous and continuous delay of a broad band signal is required.

A series stepped delay device and/or means for resetting the described continuously variable delay devices when the maximum range of the delay provided by the device is approached within predetermined limits may be combined with the described continuously variable delay devices to increase the time delay range thereof. Various other changes and modifications may be made in the above described recording system and delay devices without deviating from the spirit or scope of the present invention.

What is claimed is:

1. A recording system comprising means for supplying a composite signal to be recorded, which signal includes a timing signal, means coupled to said supplying means for recording said composite signal, means for reproducing said composite signal, a single delay device for imposing a controllable time delay on said reproduced composite signal, said delay device including means for providing a beam of carriers, means for intensity modulating said beam, means for controlling the transit time of said beam of carriers, and means for converting said beam back into a signal, means for coupling said reproducing means to said modulating means whereby the beam is intensity modulated by said reproduced composite signal, means for providing a reference signal which is related to said timing signal, means for deriving a control signal from said timing signal and said reproduced signal which control signal is related to the difference between said reproduced timing signal and said reference signal, means for coupling said control signal to said controlling means to thereby maintain said reproduced composite signal in a predetermined relationship with said composite signal.

2. Apparatus for correcting timing errors comprising means for supplying a composite signal, which signal includes a timing signal, a single delay device for imposing a controllable time delay on said composite signal, said delay device including means for providing a beam of carriers, means coupled to said supplying means for intensity modulating said beam, means for velocity modulating said intensity modulated beam, means for providing an elongated path for said velocity modulated beam, and means for converting said velocity modulated beam into a signal, means for providing a reference signal which is of the same frequency as said timing signal, means for sampling said timing signal, means coupled to said sampling means and said reference providing means for comparing said timing signal with said reference signal to derive a control signal which is proportional to the difference in timing between said timing signal and said reference signal, and means for applying said control signal to said velocity modulating means so as to control the delay provided by said delay device to thereby maintain a substantially constant relationship between said timing signal and said reference signal.

References Cited in the file of this patent

UNITED STATES PATENTS

| | | |
|---|---|---|
| 2,828,478 | Johnson | Mar. 25, 1958 |
| 2,852,750 | Goldberg | Sept. 16, 1958 |
| 2,892,022 | Houghton | June 23, 1959 |
| 2,907,957 | Dewitz | Oct. 6, 1959 |
| 2,916,709 | Putzrath | Dec. 8, 1959 |
| 2,939,035 | Reverdin | May 31, 1960 |
| 2,947,906 | Litton | Aug. 2, 1960 |
| 2,960,563 | Anderson | Nov. 15, 1960 |
| 2,960,568 | Leyton | Nov. 15, 1960 |
| 2,988,593 | Olive | June 13, 1961 |
| 3,049,589 | Johnson | Aug. 14, 1962 |